United States Patent Office 3,475,248
Patented Oct. 28, 1969

3,475,248
METHOD OF THERMOPLASTIC FILM MANUFACTURE
Donald Eugene Brasure, Tonawanda, N.Y., assignor to E. I. du Pont de Nemours and Company, Wilmington, Del., a corporation of Delaware
No Drawing. Filed Dec. 6, 1965, Ser. No. 512,010
Int. Cl. B32b 31/08; C09j 5/00
U.S. Cl. 156—229        4 Claims

ABSTRACT OF THE DISCLOSURE

Unitary film structures having a plurality of layers of thermoplastic polymeric material, such as polyvinyl fluoride, prepared by extruding a plurality of film structures from a fluid composition which can contain an opacifying coloration pigment, contacting them to form a unitary film structure, biaxially orienting the film by stretching at least 1.5× in each direction, and drying the film to remove solvent.

---

The present invention relates to shaped structures of organic thermoplastic polymeric material and, more particularly, is directed to improvements in and relating to film structures of organic thermoplastic polymeric material having strata containing opacifying coloration pigment and a process of manufacture therefor.

The present invention is generally applicable to shaped structures of a variety of organic thermoplastic polymeric materials such as, for example, polyvinyl fluoride, linear polyester, polyolefins, polycarbonates, etc. Because of the commercial importance of polyvinyl fluoride, such polymeric materials constitutes the preferred polymeric material for the shaped structures of the present invention, and the invention will be described hereinafter with specific reference to shaped articles of polyvinyl fluoride.

Polyvinyl fluoride film structures are noted for their attractive properties primarily because possessing, inter alia, excellent resistance to weathering and deterioration when exposed outdoors, a high degree of physical toughness, chemical inertness, abrasion resistance, resistance to soiling and to the action of solvents as well as remarkable retention of these properties at both low and elevated temperatures. The above combination of properties makes polyvinyl fluoride film structures highly desirable for use as outer layers of a wide variety of laminar structures designed chiefly for outdoor use, especially wherein the polyvinyl fluoride film structure serves to upgrade less functional substrates thus imparting to the laminar structure a degree of utility not possessed solely by either the polyvinyl fluoride film or the substrate material. Whether employed independently as self-supporting film structures or as a component of laminar structures, it is desirable often to impart to the polyvinyl fluoride film structure either for aesthetic or functional reasons, or both, both opacity and coloration effects.

The opacity and coloration effects can be obtained by incorporating opacifying coloration pigments into the polyvinyl fluoride film structure. However, film structures of polyvinyl fluoride containing opacifying coloration pigment undergo degradation and deterioration, i.e., "weathering," during exposure outdoors, and the pigment is commonly said to possess "poor chalk resistance," since the film structure takes on a powdery or chalky appearance. The weathering takes place continuously at the surface of the film structure and at the interface of the film and the opacifying coloration pigment, and the decreased weatherability imparted by the opacifying coloration pigment is perhaps the most significant drawback of pigmented film structures.

In addition to excellent color stability, the pigmented polyvinyl fluoride film structures must have the capability of screening out harmful actinic light, especially when such film structures are utilized as the outer layer of laminar articles intended for exposure outdoors. The outer layer of such laminar articles permits the passage of a certain amount of actinic light incident thereupon and the light which is transmitted therethrough often has a deleterious effect upon the adhesive bond wihin the laminar article. This effect is intolerable when the adhesive material is degradable by actinic light, i.e., when the adhesive material slowly degrades under the influence of either ultraviolet or visible light with resulting loss of bond strength and consequent structural failure of the laminar article as evidenced by separation of the layers thereof of such an extensive nature as often to destroy completely the useful structural integrity and unitary structure of the laminar article due to the degradation of the adhesive interlayer thereof.

Thus, incorporating high amounts of pigments into the film structure above described provides high opacity and actinic light screening power but the resulting film structure suffers from poor chalk resistance and color stability. On the other hand, incorporating low amounts of pigment into the film structures above described imparts thereto maximum weatherability characterized by improved chalk resistance and color stability but the resulting film structure suffers from low opacity and screening power.

It is, therefore, the principal object of the present invention to provide a process for the manufacture of the film structure characterized by improved weatherability (chalk resistance and color stability) and optical density (opacity and hiding power).

It is a further object of the invention to provide a process for the manufacture of the film structure of polyvinyl fluoride characterized by improved weatherability (chalk resistance and color stability) and optical density (opacity and hiding power).

According to the present invention, there is provided an improved unitary film structure of organic thermoplastic polymeric material having a plurality of layers or stratums each preferably containing opacifying coloration pigment. The unitary film structure comprises at least two stratums wherein at least one of two contiguous stratums contains opacifying coloration pigment. Preferably, the unitary film structure comprises at least two stratums wherein two contiguous stratums each contains either the same opacifying coloration pigment in different quantities or different opacifying coloration pigment in either the same or different quantity. In one embodiment the unitary film structure comprises at least two stratums wherein each of two contiguous stratums contains up to 60%, by weight based upon the polymeric material in said stratum, of opacifying coloration pigment, and wherein said film structure exhibits no distinct interface between said adjacent continguous stratums. In another embodiment, the unitary film structure comprises at least two stratums wherein one of two contiguous stratums contains 0.5% to 60%, by weight based upon the polymeric material in said stratum, of opacifying coloration pigment, and the other adjacent stratum of greater opacity than the first mentioned stratum contains 0.5% to 60%, by weight based upon the polymeric material in said other adjacent stratum, of opacifying coloration pigment, and wherein said film structure exhibits no distinct interface between said adjacent contiguous stratums. In another embodiment, the unitary film structure comprises at least two stratums wherein one of two contiguous stratums contains 0.5% to 15%, by weight based upon the polymeric material in said stratum, of opacifying coloration pigment, and the other adjacent stratum of greater opacity than the first stratum contains 5% to 35%, by weight based upon the polymeric material in said other adjacent stratum, of opacifying coloration pigment, and wherein said film structure exhibits no distinct interface between said adjacent contiguous stratums. In still another embodiment, the unitary film structure comprises a pigmented polyvinyl fluoride film, especially suitable for laminate structures, having at least two stratums each containing a different amount of opacifying coloration pigment, wherein one stratum of greater weatherability contains 0.5% to 15%, by weight based upon the weight of polyvinyl fluoride in said stratum, of opacifying coloration pigment, and one other stratum adjacent thereto of greater opacity contains 15% to 60%, by weight based upon the weight of polyvinyl fluoride in said other stratum, of opacifying coloration pigment, said film structure exhibiting no interface between said adjacent stratums. In a still further embodiment, the unitary film structure comprises a pigmented polyvinyl fluoride film, especially suitable for laminate structures, having at least two stratums each containing a different amount of opacifying coloration pigment, wherein one stratum of greater weatherability contains 0.5% to 15%, by weight based upon the weight of polyvinyl fluoride in said stratum, of opacifying coloration pigment, and one other stratum adjacent thereto of greater opacity contains 0.5% to 60%, by weight based upon the weight of polyvinyl fluoride in said other stratum, of opacifying coloration pigment unlike in color effect than the first cross-sectional component.

According to the present invention, there is further provided a process for preparing an improved unitary film structure of organic thermoplastic polymeric material having strata containing opacifying coloration pigment which comprises extruding a plurality of film structures from the same or different homogeneous mixture of organic thermoplastic material, preferably polyvinyl fluoride containing opacifying coloration pigment dispersed uniformly therein; contacting said extruded film structure to form a composite structure; quenching said composite structure to form a unitary film structure; and elongating said unitary film structure biaxially to molecularly orient said structure. The integrated process for preparing said preferred improved unitary film structure comprises heating a mixture comprising polyvinyl fluoride, a latent solvent for polyvinyl fluoride and opacifying coloration pigment to an elevated temperature effective to convert said mixture to a homogeneous single-phase fluid composition; extruding a plurality of film structures from said homogeneous single-phase fluid composition; contacting said extruded film structures to form a composite structure; quenching said composite structure to form a unitary film structure; and thereafter stretching said unitary film structure in two mutually perpendicular directions thereof while simultaneously evolving latent solvent therefrom during stretching followed by drying said unitary film structure to remove substantially all of the remaining latent solvent therefrom.

The nature and the advantages of the film structure of the present invention will be more clearly understood by the following description thereof.

The present invention provides a film of unitary structure having multiple layers or stratums each containing either the same opacifying coloration pigment of different concentration or loading levels or different opacifying coloration pigment of either the same or different concentration or loading levels thereby permitting utilization of the desirable or advantageous features of each stratum or layer without the undesirable attendant disadvantages described hereinbefore.

By way of illustration, the film structures of the present invention are characterized by improved weatherability (chalk resistance and color stability) and optical density (opacity and hiding power) in that the outer stratum or layer thereof that is exposed to the atmosphere contains a lower or reduced concentration of opacifying coloration pigment in relation to an underlying layer that may be more heavily pigmented to provide high opacity and actinic light screening power. Thus, the lower concentration of opacifying coloration pigment in the weather-exposed stratum or layer of the film structure of the present invention does not degrade and deteriorate as by exhibiting a powdery or chalky appearance and the more highly pigmented underlying layer provides high opacity and effectively screens out harmful actinic light preventing any substantial deterioration and degradation of any underlying adhesive layers as are found in laminar articles.

The concentration of opacifying coloration pigment in the weather-exposed stratum or layers of the film structure is only that which is necessary for maintaining the aesthetic appearance of the unitary structure and, preferably, to shield the remaining portion of the film structure from excessive photo-degradation while maintaining the highest possible degree of weatherability. The concentration level for the outer layer has been found to be up to 60%, preferably 0.5% to 15%, by weight based upon the weight of polymeric material, of opacifying coloration pigment. The weatherability (chalk resistance and color stability) improves at successively lower concentrations of opacifying coloration pigment.

The concentration of opacifying coloration pigment in the underlying strata or layers of the film structure is only that which is necessary for maintaining the desired degree of opacity and for preventing photo-degradation in the bonds between the adhesive/film and the adhesive/substrate as well as the adhesive itself. It has been found that the degree of opacity necessary for preventing adhesive bond degradation is that corresponding to about 0.5% to 60%, preferably 5% to 35%, by weight based upon the weight of the polymeric material, of the opacifying coloration pigment. Consideration of the ultimate aesthetic appearance of the film may influence the selection of the given opacifying coloration pigment(s) and the specific concentration levels thereof within the above specified ranges.

The thickness of the weather-exposed stratum or layer may be considerably thinner than the underlying strata or layers, since the high concentration of opacifying coloration pigment may be incorporated into the underlying non-weather exposed stratum or layer. Thus, the outer or weather-exposed stratum of the film structure can be reduced as to both concentration of opacifying coloration pigment and thickness. As a result, the total structure of the film of the present invention can be of thinner cross-section than a film of the same optical density having an essentially uniform concentration of opacifying coloration pigment, and the former structure affords the maximum utilization of the polymeric material from a weatherability standpoint.

In most instances the strata or layers of the film structure will each contain opacifying coloration pigments to produce the same color effect; however, different mixtures of the same pigments resulting in entirely different color effect are entirely suitable. Although the film structure will most often be of a single color, it is possible that in many instances cross-sectional components of different color, e.g., a medium blue top component and a carbon black filled under-component, may be desirable to gain the desired weatherability and opacity in a thin film (i.e., thinner than a film of same equivalent optical density of a uniform pigment concentration). It should be noted that in not all instances does the stratum or layer having the greater degree of opacity also have the greater opacifying coloration pigment concentration.

In this connection, film structures having the same mil percent opacifying coloration pigment concentration (with the same pigment) have equivalent optical densities. To illustrate, by way of example, the following film structures:

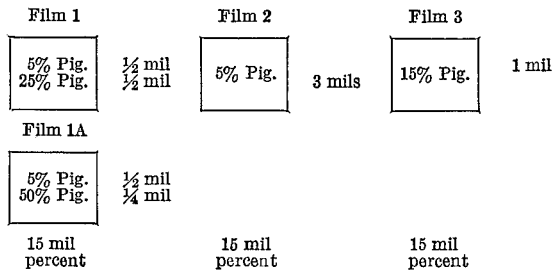

each have the same mil percent concentration—15 mil percent—and each have equivalent optical densities. Film structures 1, 1A, and 2 have the same weatherability and are superior in this regard to film structure 3. Films 1 and 1A illustrate the unique feature of the film structure of the present invention of using thinner films while obtaining maximum utilization of the weatherable material without sacrificing optical density and hiding power.

Although the opacifying coloration pigments employed in the film structures of the present invention are termed "opacifying," it should be understood that they need not be opaque in the sense that they totally obstruct the passage of light. Any coloration pigment or combination of coloration pigments, including whites and blacks as well as true specular colors between these extremes may be employed for the purpose of the present invention. Among pigments which may be succesfully incorporated into the film structure, there may be mentioned all titanium dioxides, basic zinc chromate, oxides of iron, phthalocyanine greens and blues, chrome green, chrome yellow, cadmium selenide red, lamp black, quinacridon, molybdenum chromate, indanthrone, perylene, pyranthrone, pyraxolone, imidazole, anthanthrone, flavanthrone, cadmium sulfide, cadmium sulfide/cadmium selenide, cadmium sulfide/mercury sulfide and the cobalt-silica and cobalt-aluminate systems, etc. The opacifying coloration pigments are employed in a finely comminuted state, such as can conveniently be obtained without serious economic penalty.

In one preferred embodiment of the dual-layer film structure of the present invention, one layer thereof is white and the other layer is black. The white layer preferably contains titanium dioxide pigment in an amount between about 5% and about 60% by weight, based upon the polyvinyl fluoride content thereof, to provide a mil percent opacifying value between about 5 and 60. The black layer preferably contains carbon black in an amount between about 3% and about 40% by weight, based upon the polyvinyl fluoride content thereof, to provide a mil percent opacifying value between about 6 and 80. The above-described dual-layer film structure is eminently suitable as a base sheet for photographic films adapted for receiving thereon a suitable photosensitive photographic silver halide-containing emulsion.

The unitary film structure of the present invention is preferably derived from vinyl fluoride polymers which, in addition to homopolymers of vinyl fluoride, may embrace copolymers of vinyl fluoride with other mono-ethylenically unsaturated monomers copolymerizable therewith wherein the vinyl fluoride is present in substantial or major amounts, i.e., at least 75% to 80% of the total by weight. Suitable examples of unsaturated comonomers include mono-ethylenic hydrocarbons, e.g., ethylene, propylene, isobutylene and styrene; halogen-substituted mono-ethylenic hydrocarbons,, e.g., vinyl chloride, vinyl bromide, 1,1-dichloroethylene, 1,1-difluoroethylene difluorochloroethylene, trifluorochloroethylene, tetrafluoroethylene, trifluoropropylene, difluoroisobutylene; vinyl esters, e.g., vinyl formate, vinyl acetate, vinyl propionate, vinyl butyrate, vinyl benzoate vinyl pivalate, vinyl stearate, vinyl esters of inorganic acids; vinyl ethers, e.g., vinyl ethyl ether, tetrafluoroethylallyl ether and vinyl dioxalane; vinyl ketones, e.g., methyl vinyl ketone; N-vinyl imides, e.g., N-vinyl succinimide, and N-vinyl phthalimide; acrylic and methacrylic acids and their derivatives ,e.g., esters, amides, anhydrides and acid halides, including methyl methacrylate, beta-hydroxyethyl methacrylate, allyl methacrylate, N-butyl methacrylamide, etc.; derivatives of maleic and fumaric acids, e.g., diethylmaleate and dimethylfumarate; propenyl esters, e.g., allyl acetate, isopropenyl acetate, etc. Similarly polyvinylidene fluoride and copolymers thereof, as well as fluorocarbon polymers, provide suitable unitary film structure. Suitable fluorocarbon polymers include polytetrafluoroethylene, polymonochlorotrifluoroethylene, copolymers of hexafluoropropene and vinylidene fluoride, copolymers of tetrafluoroethylene with other fluorinated ethylenically unsaturated monomers, e.g., hexafluoropropene, vinyl fluoride and vinylidene fluoride.

The unitary film structure need not be limited to a structure derived from similar polymer throughout, but depending upon the desired end-use application or economy, may be of dissimilar chemical or physical character. For example only, and not by way of limitation, suitable polymeric components with, for instance, polyvinyl fluoride include polyethylene terephthalate/isophthalate/sebacate (33/17/50), polyacryonitrile, polyvinyl fluoride/polyacrylonitrile (50/50), polyvinylidene fluoride, polyvinylidene chloride, polyethylene, polypropylene, chlorinated linear polypropylene, iminated polymer of butyl acrylate/butyl methacrylate/methylmethacrylate/methacrylic acid (9/45.7/35.3/10), and other similar polymers.

The unitary film structures of the present invention may be laminated to substrates by methods known per se utilizing known suitable adhesives. Examples of substrates include metal substrates such as cold rolled steel, iron, galvanized iron and steel, aluminum, aluminized steel, chromium, bronze, brass, led, tin and nickel, and various other alloys; glass and other vitreous substrates such as those of porcelain and china; impregnated substrates such as asphalt-impregnated cellulosic; hardboards such as "Masonite;" cement-asbestos boards; wood substrates such as those of birch, oak, fir, pine, hemlock, cedar, redwood, poplar, and ash as well as the plywoods for use as siding and/or roofing for houses and other domestic structures as well as for commercial, industrial and institutional buildings; and polymeric substrates such as those of homopolymers of vinyl chloride and copolymers thereof with, for example, vinylidene chloride, vinyl acetate and fumaric, maleic and acrylic esters, those of regenerated cellulose, those of acrylic esters, those of urea-, melamine- or phenol-formaldehyde resins, and those of vinyl acetates. Laminations to metal and wooden substrates can be employed in the manufacture of outdoor signs, wall tile, wall and ceiling paneling, Venetian blinds, interior partitioning, awnings, ductwork, counter- and table-tops, store fronts, rain gutters and downspouts. Laminations to metal, particularly of pigmented polyvinyl fluoride films, can be postformed and employed to replace enameled and baked wall, ceiling, floor and side members of applications such as refrigerators, freezers, air conditioners, dehumidifiers, hot-water heaters, washers and dryers, kitchen cupboards and cabinets. In the automotive field, laminations of metallized and pigmented polyvinyl fluoride films to metal substrates can be employed variously as automobile door and side paneling, hard stops, moldings, interior and exterior trim, instrument paneling, wheel covers and hub caps, siding and tops for house trailers and truck and van bodies. Prior to lamination, metallic substrates can and usually are given a conventional passivation or corrosion-inhibiting treatment such as that used commercially to prepare substrates for painting. Laminated to coated or uncoated fabrics or to polymeric films, polyvinyl fluoride films can serve as headliners, seat covers, floor mats and trunk liners. Other uses for the laminates of this invention include upholstery, floor coverings, lamp shades and book bindings. Of course, a second layer of polyvinyl fluoride can also be used as substrates. Of course, the film structure alone may be of particular advantage, especially in such applications of preferential surface exposure as, for example, solar stills and similar structures exposed outdoors.

If desired, modifiers, such as ultraviolet light absorber compounds, thermal stabilizers, wetting agents, deglossing agents, antioxidants, fillers, etc., may be added to the polymeric material constituting the unitary film structure of the present invention. Suitable ultraviolet light absorber compounds include, for example, 4 or 4'-acrylic esters of 2-hydroxybenzophenone and acetophenones; poly(2-hydroxyaryl) ketones; polymers of aldehyde/2-hydroxybenzophenone; polymers of 4,4'-epoxyalkoxy-2-hydroxybenzophenone; polymers of acrylic esters of salicycloylbenzomethane; polymers of acrylic esters of salicylates; polymers of 2'-acrylic esters of 2-hydroxybenzophenone; and other commercial products such as "Cyasorb" UV9, "Cyasorb" UV24, "Cyanasorb" UV531, manufactured by American Cyanamid; "Uvinul's" 400, 490, D-49, D-50, and M-40, manufactured by General Aniline & Film Corp. It is preferred, in the case of film structures employing no opacifying coloration pigment in the outer or weather-exposed stratum, to incorporate from 2% to 99%, preferably 5% to 25%, by weight based upon the weight of the polymeric material in the outer stratum, of the ultraviolet light absorber material into the outer stratum.

Suitable thermal stabilizers include, for example, salts of carboxylic acids, epoxy compounds, organo metallic salts and combinations thereof, "Epon" 1004 and "Epon" 828 manufactured by Shell Development Corp. and 12V5 manufactured by Ferro Chemical Corp., with or without antioxidants.

Suitable antioxidants include, for example, Santivar and Santowhite manufactured by Monsanto Chemical Co. and Tenox BHA manufactured by Eastman Kodak.

Suitable deglossing agents include, for example, particulate calcium carbonate and silica and silica/wetting agent combination described and claimed in applications Ser. No. 228,263, filed Oct. 4, 1962 now U.S. Patent No. 3,326,739; Ser. No. 433,509, filed Feb. 17, 1965 now abandoned; and Ser. No. 433,499, filed Feb. 17, 1965 now abandoned, all of which are assigned to the assignee of the present invention.

The process provided by the present invention essentially comprises extruding under the conditions described in U.S. Patent 2,953,818 a plurality of film structures from the same or different homogeneous mixture of organic thermoplastic material, preferably polyvinyl fluoride, containing opacifying coloration pigment dispersed uniformly therein; contacting said extruded film structures to form a composite structure; quenching said composite structure to form a unitary film structure; and elongating said unitary film structure biaxially under the conditions described in U.S. Patent 3,139,470 to molecularly orient said structure. The integrated process for preparing the preferred improved unitary film structure comprises heating a mixture comprising polyvinyl fluoride, a latent solvent for polyvinyl fluoride and opacifying coloration pigment to an elevated temperature effective to convert said mixture to a homogeneous single-phase fluid composition; extruding a plurality of film structures from said homogeneous single-phase fluid composition; contacting said extruded film structures preferably within the extruder element to form a composite structure thereof; quenching said composite structure to form a unitary film structure; and thereafter stretching said unitary film structure in two mutually perpendicular directions while simultaneously evolving latent solvent therefrom followed by drying said unitary film structure to remove substantially all of the remaining latent solvent therefrom.

More specifically, one method of forming the pigmented polyvinyl fluoride films of the present invention comprises feeding a mixture of latent solvent, opacifying coloration pigment, ultraviolet light absorber compound, a thermal stabilizer, and other desired modifiers, and particulate polyvinyl fluoride to a heated extruder of conventional design and provided with a heated casting hopper having lips suitably spaced to form the extrudate passing therebetween into a film of predetermined thickness. The mixture in the extruder is heated to a temperature effective to coalesce completely the polymer particles and form a single phase fluid composition. For dual or multiple layered film structure, mixtures may be continuously pumped to individual heated extruders connected to a common co-casting hopper. A tough coalesced extrudate of polyvinyl fluoride film is continuously extruded in self-supporting film form containing latent solvent and then quenched. The film is then preferably heated and stretched in one or more directions while the solvent is volatilized therefrom.

Any convenient arrangement of suitable conventional apparatus may be employed to carry out the process. While any convenient technique may be employed in preparing the mixtures to be fed to the extruder, a typical preparation is as follows: all of the particulate polyvinyl fluoride is dispersed in a sufficient quantity of latent solvent such as, for example, N,N-dimethylacetamide, to provide a fluid homogeneous dispersion which is filtered or screened and delivered into a blend tank. All of the opacifying coloration pigment is dispersed in an additional portion of the latent solvent until a rather concentrated but fluid homogeneous dispersion is obtained which also is screened and delivered into the same blend tank. The modifiers and additives such as the thermal stabilizer, the ultraviolet light absorber, and other desired modifiers are added to the blend tank and blended therein. The blending with the latent solvent may be carried out in a wide variety of mixing equipment including Hobart mixers, and Waring blenders, ball mills, colloid mills, and sand grinding equipment such as that described in U.S. Patent 2,581,414, etc.

An extrudable composition may be formed containing as little as 15% latent solvent by weight. Depending somewhat on the polymer itself, particles thereof tend to settle out in the range of about 10% by weight of solvents. The preferred solvent concentration range is from 40% to 65%, most preferably about 60%. The contents of the blend tank are continuously and slowly mixed to thoroughly blend the contents and to maintain the homogeneity of the resulting composition which is then pumped to the extruder. The multiple-layer, unitary film structure may be prepared in any of several manners, for example; co-extrusion, with a common hopper or through individual hoppers closely aligned; extrusion with coating; coating solution/coating solution, etc., and combination thereof such as, for example, co-extrusion and dispersion coating.

Also, the feed may be comprised of finely chipped flakes of recycled polyvinyl fluoride film. Recycled film may comprise either solvent-containing or solvent-free polyvinyl fluoride chips. Recycled material may be optionally combined with polymer not previously extruded and/or with fresh latent solvent. Plasticizers, modifiers, softeners, dryers, fillers, natural or synthetic resins, antioxidants may, if desired, be incorporated into the feed by any suitable mixing technique in addition to the ultraviolet light absorber compound and pigment.

The principle and practice of the present invention will now be illustrated by the following examples which are exemplary only and it is not intended that the invention be limited thereto since modifications in technique and operation will be apparent to anyone skilled in the art. All parts and percentages are by weight unless otherwise specified.

EXAMPLE 1

Film forming compositions of polyvinyl fluoride were prepared and unitary film structures made therefrom in the following manner: A first blend tank was filled with a mixture of 40% solids and 60% N,N' - dimethylacetamide wherein the solids represented on a dry weight basis; 35.5% polyvinyl fluoride; 2% pigment (a turquoise blend); 0.4% polyglycidyl ether ("Epon" 1004) and 0.10% triphenylphosphite and 2.0% deglossing agent ("Syloid" 72). A second blend tank was filled with mixture of 40% solids and 60% N,N'-dimethylacetamide wherein the solid represented on a dry weight basis; 26.7% polyvinyl fluoride; 9.6% pigment (as in first blend); 0.4% polyglycidyl ether ("Epon" 1004); 0.10% triphenylphosphite and 3.2% deglossing agent ("Celite"—Super Floss). The compositions were each thoroughly blended by mixing and were continuously pumped to individual heated extruders maintained at 174° C. and 149° C. respectively, and connected to a common co-casting hopper having a 14 inch casting slot and an average lip spacing of 27 mils, from which issued a coalesced latent solvent-containing dual-layer, polyvinyl fluoride film which was immediately cooled by conducting it through a water quench bath maintained at 130 C. The latent solvent containing film was then continuously stretched first longitudinally 1.60× at 60° C. and transversely 2.65× at a temperature in the range of 110° C. to 150° C. followed by "drying," that is, volatilization of the remaining N,N'-dimethylacetamide by exposure for about four seconds to an ambient temperature of about 195° C. The resulting turquoise dual-layer, unitary film structure of polyvinyl fluoride was 1.10 mils in total thickness and the top component was 0.33 mil thick and the color coordinates thereof were: $L=57.9$, $a=-13.3$, $b=-3.5$.

A control film 1.75 mils thick was prepared in essentially the same manner but containing 11½% of the opacifying coloration pigment uniformly distributed throughout the single layer thereof.

The film structures were evaluated for weatherability (chalk resistance and color stability) and optical density (absorbance/mil) and the results are shown in Table 1 below:

EXAMPLE 2

A dual-layer, unitary film structure of polyvinyl fluoride was prepared following the procedure described in Example 1. The first blend tank was filled with a mixture of 40% solids and 60% N,N'-dimethylacetamide wherein the solids represented on a dry weight basis 35.5% polyvinyl fluoride; 2% pigment (a beige blend); 0.4% polyglycidyl ether "Epon" 1004); 0.10% triphenylphosphite and 2% deglossing agent ("Syloid" 72). The second blend tank was filled with a mixture of 40% solids and 60% N,N'-dimethylacetamide wherein the solids represented on a dry weight basis 23.5% polyvinyl fluoride; 12.8% pigment (as in first blend); 0.4% polyglycidyl ether ("Epon" 1004) and 0.10% triphenylphosphite and 3.2% deglossing agent ("Celite"—Super Floss). The compositions were blended and extruded and the resulting unitary film structure stretched and dried under the conditions of Example 1. The resulting beige, dual-layer, unitary polyvinyl fluoride film structure was 1.10 mils in total thickness and the top component was 0.35 mil thick and the color coordinates thereof were: $L=76.4$, $a=+5.0$, $b=+15.6$.

A control film, 1.85 mils thick, was prepared in essentially the same manner but containing 19% pigment uniformly distributed throughout the single layer thereof.

The film structures were evaluated for weatherability and optical density and the results are shown in Table 2 below:

TABLE 2

| | Pigment Concentration, Percent by Wt. | Film Layer Thickness, Mil | Total Film Thk., Mils | Pigment Concentration, Mil Percent | Absorbance at Indicated Wavelengths (Millimicrons) | | | | Hours in Weather-O-meter | | |
|---|---|---|---|---|---|---|---|---|---|---|---|
| | | | | | 545 | 485 | 435 | 405 | ΔL=2 | ΔE=2 | ΔE=3 |
| Dual-Layer Film | 5/42 | 0.35/0.75 | 1.10 | 27.75 | 1.74 | 2.10 | 2.63 | 4.00 | 6,200 | 5,000 | 6,200 |
| Control Film | 19 | 1.85 | 1.85 | 35.2 | 1.23 | 1.49 | 1.84 | 2.70 | 2,600 | 1,700 | 2,400 |

As in Example 1, the dual-layer, unitary film structure is more opaque per mil of thickness and more weatherable (greater chalk resistance and better color stability) than the control film.

EXAMPLES 3 TO 7

Dual-layer, unitary film structures of polyvinyl fluoride were prepared in accordance with the procedure described in Example 1. The results and pertinent data are summarized for the unitary film structures, along with comparative data for each separate independent layer thereof, in Table 3 below.

TABLE 1

| | Pigment Concentration, Percent by wt. | Film Layer Thickness, Mil | Total Film Thk., Mils | Pigment Concentration, Mil. percent | Absorbance at Indicated Wavelengths (Millimicrons) | | | | Hours in Weather-O-meter | | |
|---|---|---|---|---|---|---|---|---|---|---|---|
| | | | | | 545 | 482 | 435 | 405 | ΔL=2 | ΔE=2 | ΔE=3 |
| Dual-Layer Film | 5/24 | 0.33/0.77 | 1.10 | 20.13 | 2.78 | 2.75 | 3.26 | >4.6 | 5,900 | 5,400 | 8,000 |
| Control Film | 11½ | 1.75 | 1.75 | 20.13 | 1.82 | 1.31 | 1.59 | 2.23 | 4,500 | 4,000 | 5,500 |

The duel-layer, unitary film structure is more opaque per mil of thickness and more weatherable (greater chalk resistance and better color stability) than the control film.

TABLE 3

| Example | Film | Pigment Concentration, Percent by Wt. | Film Layer Thickness, Mil | Total Film Thick., Mil | Pigment Concentration, Mil Percent | Absorbance At Indicated Wavelengths (Millimicrons) | | | | Color Coordinates | | |
|---|---|---|---|---|---|---|---|---|---|---|---|---|
| | | | | | | 545 | 525 | 485 | 465 | L | a | b |
| 3 | A (beige) | 20 | 1.5 | 1.5 | 30.0 | 1.82 | 1.92 | 2.16 | 2.37 | 69.3 | 7.1 | 17.2 |
| | B (black) | 5 | 0.9 | 0.9 | 4.5 | 3.30 | 3.25 | 3.25 | 3.25 | 10.8 | 0.1 | −1.1 |
| | A/B | 20/5 | 1.5/0.9 | 2.4 | 34.5 | >5 | >5 | >5 | >5 | | | |
| 4 | C (gold) | 18 | 2.1 | 2.1 | 37.8 | 1.04 | 1.10 | 2.37 | 1.58 | 67.0 | 2.2 | 27.3 |
| | B (black) | 5 | 0.9 | 0.9 | 4.5 | 3.30 | 3.25 | 3.25 | 3.25 | 10.8 | 0.1 | −1.1 |
| | C/B | 18/5 | 2.1/0.9 | 3.0 | 42.3 | 4.5 | 4.6 | 4.5 | 4.5 | | | |
| 5 | F (yellow) | 20 | 2.6 | 2.6 | 52.0 | 0.37 | 0.45 | 0.98 | 1.30 | 75.9 | −16.6 | 76.4 |
| | B (black) | 5 | 0.9 | 0.9 | 4.5 | 3.30 | 3.25 | 3.25 | 3.25 | 10.8 | 0.1 | −1.1 |
| | F/B | 20/5 | 2.6/0.9 | 3.5 | 56.5 | 4.1 | 4.03 | 4.6 | 4.6 | | | |
| 6 | D (orange) | 20 | 2.8 | 2.8 | 56.0 | 4.48 | 3.72 | 3.42 | 3.85 | 45.5 | 54.8 | 51.5 |
| | B (black) | 5 | 0.9 | 0.9 | 4.5 | 3.30 | 3.25 | 3.25 | 3.25 | 10.8 | 0.1 | −1.1 |
| | D/B | 20/5 | 2.8/0.9 | 3.7 | 60.5 | >5 | >5 | >5 | >5 | | | |
| 7 | E (red-yellow) | 20 | 2.8 | 2.8 | 56.0 | 3.48 | 3.71 | 3.73 | 4.01 | 48.1 | 30.0 | 30.5 |
| | B (black) | 5 | 0.9 | 0.9 | 4.5 | 3.30 | 3.25 | 3.25 | 3.25 | 10.8 | 0.1 | −1.1 |
| | E/B | 20/5 | 2.8/0.9 | 3.7 | 60.5 | >5 | >5 | >5 | >5 | | | |

In Examples 3 to 5 of Table 3, the single layer film structures are compared with dual-layer film structures wherein the underlying layer thereof has a lower mil percent pigment concentration and a HIGHER absorbance than the top layer. It is observed that the dual-layer, unitary film structure can be thinner and still be more opaque (greater optical density) than a single layer film of the same thickness having the same total pigment loading uniformly distributed therein.

In Examples 6 and 7 of Table 3 the single layer film structures are compared with dual-layer film structures wherein the underlying layer has a lower mil percent pigment concentration and a LOWER absorbance than the top layer. It is observed that a dual-layer, unitary film structure can be more opaque (greater optical density) than a single layer film of the same thickness having the same total pigment concentration uniformly distributed therein.

EXAMPLE 8

A dual-layer, unitary film structure of polyvinyl fluoride having one white layer and one black layer was prepared following the procedure described in Example 1. The first blend tank was filled with a mixture of 40% solids and 60% N,N'-dimethylacetamide wherein the solids represented on a dry weight basis 27.5% polyvinyl fluoride; 12% $TiO_2$, 0.4% polyglycidyl ether ("Epon" 1004) and 0.10% triphenylphosphite. The second blend tank was filled with a mixture of 40% solids and 60% N,N'-dimethylacetamide wherein the solids represented on a dry weight basis 33.1% polyvinyl fluoride; 10% lamp black and 6% $TiO_2$; 1% polyglycidyl ether ("Epon" 1004) and 0.25% triphenylphosphite. The resulting dual-layer, unitary film structure of polyvinyl fluoride had a white layer of 1 mil thickness and a black layer of 2 mils thickness and the color coordinates thereof were: white: $L=88.90$, $a=0.0$, $b=-2.09$; black: $L=10.8$, $a=+0.1$, $b=-1.1$. The oriented unitary film structure, after stretching $1.6\times$ in the longitudinal direction of film extrusion and $2.1\times$ in the transverse direction of film extrusion had the following physical properties:

| Film Direction | Elongation at break, percent | Tenacity, K p.s.i. | Modulus, K p.s.i. | Shrinkage at 170° C., percent |
|---|---|---|---|---|
| Longitudinal | 155 | 9.7 | 331 | 7.5 |
| Transverse | 119 | 15.8 | 324 | 7.2 |

The foregoing film is eminently suitable as a base film for the photographic film since characterized by nearly total or complete opacity and highly reflective surface. The white surface may be conveniently surface treated as by, for example, the flame treatment method for adhesion of photographic emulsions thereto. The black surface may be surface treated in a like manner for adhesion and lamination to other substrate materials.

EXAMPLE 9

Film forming compositions of polyvinyl fluoride were prepared and unitary film structures were made therefrom following the procedure described in Example 1. The first blend tank contained 34.72% polyvinyl fluoride; 4.8% green opacifying coloration pigment; 0.48% polyglycidyl ether ("Epon" 1004) and triphenyl phosphite in a 4 to 1 weight ratio and 60% N,N'-dimethylacetamide. The second blend tank contained 36.5% polyvinyl fluoride and 63.5% N,N'-dimethylacetamide. A third blend tank contained 36.5% polyvinyl fluoride, 1.9% ultraviolet light absorber-(poly - 4 - methacryloxy-2-hydroxybenzophenone) and 61.6% N,N'-dimethylacetamide.

The mixture from the first blend tank was continuously pumped to a heated extruder maintained at 165° C. and connected to a casting hopper having a 27 inch casting slot and an average lip spacing of 25 mils, from which issued a coalesced latent solvent containing polyvinyl fluoride film which was immediately cooled by conducting it through a water quench bath maintained between 10 and 15° C. This latent solvent containing film was then continuously stretched first longitudinally $2\times$ at 80° C. and then transversely $2\times$ at a temperature in the range of 110 to 150° C. followed by "drying," that is, volatilization of the remaining N,N'-dimethylacetamide by exposure for about 20 seconds to an ambient temperature of about 200° C. The resulting polyvinyl fluoride film was 2 mils thick and had the following color coordinates: $L=79.66$, $a=-26.61$, $b=-5.12$.

A unitary film structure was prepared in a similar manner by continuously pumping mixtures from blend tanks Nos. 1 and 2 to individual heater extruders maintained at 165° C. and connected to a common co-casting hopper. The film structure was processed in the manner previously described. The resulting unitary film structure was 2 mils in total thickness; the clear top component was about 0.3 mil thick and the film structure had color coordinates: $L=79.38$, $a=-27.29$, $b=-4.71$.

Another unitary film structure was similarily prepared from the mixtures of blend tanks Nos. 1 and 3. The resulting unitary film structure was 2 mils in total thickness; the clear ultraviolet light absorber compound containing component was about 0.3 mil thick. The unitary film structure had color coordinates: $L=81.61$, $a=-20.47$, $b=-3.71$.

The films were compared for weatherability chalk resistance, color stability and optical density and the results are shown in Table 4 below:

TABLE 4

| | Total Thickness, Mils | Hours in Weather-O-meter | | | Absorbance per mil at Indicated Wavelengths (Millimicrons) | | | |
|---|---|---|---|---|---|---|---|---|
| | | $\Delta L=2$ | $\Delta E=2$ | $\Delta E=3$ | 545 | 485 | 435 | 405 |
| Film No. 1 | 2 | <250 | <250 | 300 | 1.17 | 1.20 | 1.93 | 2.52 |
| Film No. 2/1 | 2 | 550 | 350 | 500 | 1.01 | 1.03 | 1.64 | 2.14 |
| Film No. 3/1 | 2 | 9,520 | 1,000 | 1,500 | 1.04 | 1.08 | 1.69 | 2.21 |

The tabulated data illustrates the principal advantage of the unitary film structure having a clear outer stratum containing an ultraviolet light absorber compound, namely, the dramatic decrease in the rate of chalking ($\Delta L$).

EXAMPLE 10

Dual-layer, unitary film structures of polyvinyl fluoride were prepared in accordance with the procedure described in Example 9. In each of the samples tabulated below, the dual-layer, unitary film structure consisted of a base layer of polyvinyl fluoride of 1.7 mils thickness containing 18% by weight of green pigment, based upon the polyvinyl fluoride content thereof, and had color coordinates of: $L=79.66$, $a=-26.61$, $b=-5.12$; the top layer of each sample was 0.3 mil thick and consisted of the polymeric material in the indicated parts by weight tabulated in the table below. The film structures were evaluated for weatherability and the results are summarized for each of the samples prepared, along with that of a comparative sample (Sample a) having no top layer, in Table 5 below:

are the changes in lightness, red-green and yellow-blue coordinates, respectively, and is a measure of the total

TABLE 5

| Film Sample | Top layer | UV Light Absorber | Weight Percent UV Absorber | Hours in Weather-O-meter to ΔL=2 |
|---|---|---|---|---|
| a (Control) | None | | | <250 |
| b | PVF | poly(4-methacryloxy-2-hydroxybenzophenone) | 0 | 800 |
| c | PVF | do | 1 | 1,200 |
| d | PVF | do | 2 | 5,500 |
| e | PVF | do | 5 | >8,500 |
| f | PVF | do | 10 | >8,500 |
| g | PVF | do | 25 | >8,500 |
| h | PVF | do | 50 | >8,500 |
| i | PVF | do | 75 | >8,500 |
| j | PVF | do | 90 | >6,500 |
| k | PVF | 2-hydroxy-4-octoxybenzophenone | 5 | >5,500 |
| l | PVF | do | 10 | >5,500 |
| m | PVF | poly(2-hydroxy-4-acryloxybenzophenone) | 5 | >5,500 |
| n | PVF | do | 10 | >5,500 |
| o | HFA/VF (5/95) | None | 0 | 1,750 |
| p | HFA/VF (16/84) | do | 0 | 2,750 |
| q | HFA/VF (20/80) | do | 0 | 4,500 |
| r | VF₂ | poly(4-methacryloxy-2-hydroxybenzophenone) | 0 | 1,500 |
| s | VF₂ | do | 10 | 6,020 |
| t | VF₂/TFE (20/30) | do | 0 | 750 |
| u | VF₂/TFE (70/30) | do | 10 | 2,250 |

Legend: PVF=polyvinyl fluoride; HFA=hexafluoroacetone; VF=vinyl fluoride; VF₂=vinylidene fluoride; TFE=tetrafluoroethylene.

The data tabulated in Table 5 also illustrates the principle and advantage of the unitary film structure having a clear outer stratum containing an ultraviolet light absorber compound, namely the dramatic decrease in the rate of chalking, as measured by ΔL.

EXAMPLE 11

Dual-layer, unitary film structures comprising a top layer of polyvinyl fluoride and a bottom layer of the polymeric material indicated in Table 6 below, were prepared following the procedure described in the preceeding examples. In each of samples (a) to (f) tabulated below, the dual-layer unitary film structure consisted of a top layer of 0.3 mil thickness containing 5% by weight of blue pigment, based upon the polyvinyl fluoride content thereof, having color coordinates of: $L=36.16$, $a=-8.88$, $b=-11.04$. The bottom layer of each sample was 1.7 mils thick and contained 5% by weight of carbon black pigment, based upon the polymeric content thereof. The film structures were evaluated for opacity and weatherability and the results are summarized in Table 6 below for each of the samples:

color stability of a film sample. The change in L or delta L is a measure of chalking resistance.

The definition of the NBS unit and the E, L, $a$ and $b$ components of color, and calculations thereof, are described in the following references: Judd, D. B., Color in Business, Science and Industry, pages 294 to 296, John Wiley & Sons, New York, 1952; Hunter, R. S., Photoelectric Tristimulus Colorimetry with Three Filters, National Bureau of Standard Circ., C429, July 1942; Federal Specification TT-P-141b, Test Method 623.1, Paint, Varnish, Lacquer and Related Materials, Methods of Inspection, Sampling and Testing, January 1947.

The components of color of the film samples were evaluated with a colorimeter manufactured by Manufacturers Engineering and Equipment Corp., Hatboro, Pa., Model IV.

What is claimed is:

1. A method of manufacture for preparing unitary film structures of organic thermoplastic material having a plurality of layers or stratums wherein at least one layer contains opacifying coloration pigment which comprises extruding a plurality of film structures from different

TABLE 6

| Film Sample | Top Layer | Bottom Layer | Absorbance (at 545 mμ) | Hours in Weather-O-meter to ΔL=2 |
|---|---|---|---|---|
| a | PVF | Polyester [1] | >5 | >1,000 |
| b | PVF | Polyester/PVF [2] | >5 | >1,000 |
| c | PVF | Polyacrylonitrile | >5 | >500 |
| d | PVF | Polyacrylonitrile/PVF [3] | >5 | >500 |
| (e) | PVF | Chlorinated Polypropylene | >5 | >500 |
| (f) | PVF | Iminated Acrylate Polymer [4] | >5 | >1,000 |
| (g) (Control) | Single Layer, 2-mil Thick PVF | 5% Blue Pigment | 1.6 | >1,200 |
| (h) (Control) | do | 10% Blue Pigment | 2.4 | 1,500 |
| (i) (Control) | do | 20% Blue Pigment | >5 | 800 |

[1] Copolymer of polyethylene terephthalate-polyethylene isophthalate-polyethylene sebacate of 33%, 17% and 50% by weight, respectively.
[2] 47.5 parts by weight of polyester in (¹) and 47.5 parts by weight of PVF, having 5 parts by weight of carbon black incorporated therein.
[3] 50/50 by weight.
[4] Iminated polymer of butyl arcylate-butyl methacrylate-methyl methacrylate-methacrylic acid of 9%, 45.7%, 35.3% and 10% by weight, respectively.

The weatherability of the film structures in the preceding examples was determined by subjecting samples of film structures, separately or in laminated form, to a complex environment which includes heat, ultraviolet light, visible light and moisture in an Atlas Sunshine Arc Weather-O-meter Model XW–R, and noting the number of hours a sample survives to a given change of NBS units in E and L. The change in E or delta E is expressed mathematically as $\sqrt{\Delta L^2 + \Delta a^2 + \Delta b^2}$, where ΔL, Δa, Δb homogeneous mixtures of organic thermoplastic material containing opacifying coloration pigment; contacting said extruded film structures to form a composite structure; quenching said composite structure to form a unitary film structure; and elongating said unitary film structure biaxially to molecularly orient said structure, the differences of said homogeneous mixtures being selected from differences in pigment, differences in pigment concentration, and differences in both pigment and pigment concentration.

2. A method of manufacture for preparing unitary film structures of organic thermoplastic polymeric material having a plurality of layers or stratums wherein at least one layer contains opacifying coloration pigment which comprises heating one or more mixtures comprising polyvinyl fluoride, a latent solvent for polyvinyl fluoride and opacifying coloration pigment to an elevated temperature effective to convert said mixtures to homogeneous single-phase fluid compositions; extruding a plurality of film structures from said homogeneous single-phase fluid compositions; contacting said extruded film structures to form a composite structure; quenching said composite structure to form a unitary film structure; and thereafter stretching said unitary film structure in two mutually perpendicular directions thereof while simultaneously evolving latent solvent therefrom followed by drying said unitary film structure to remove substantially all of the remaining latent solvent therefrom.

3. The method of manufacture of claim 2 wherein the unitary film structure is molecularly oriented biaxially by stretching at least 1.5× in each of two mutually perpendicular directions thereof.

4. The method of manufacture of claim 3 wherein the single-phase fluid composition is extruded at a temperature above about 140° C. and the extruded composite structure is quenched at a temperature below about 15° C.

References Cited

UNITED STATES PATENTS

| | | | |
|---|---|---|---|
| 3,405,027 | 10/1968 | Wyckoff | 156—229 X |
| 3,342,657 | 9/1967 | Dyer | 156—163 |
| 3,380,868 | 4/1968 | Moser | 156—229 |
| 3,388,196 | 6/1968 | Farrell | 156—244 X |
| 3,397,101 | 8/1968 | Rausing | 156—244 X |
| 3,397,108 | 8/1968 | Hecht et al. | 161—189 |
| Re. 26,237 | 7/1967 | Rowland | 156—244 |
| 2,879,547 | 3/1959 | Morris | 161—189 X |
| 2,892,383 | 6/1959 | Walworth et al. | 350—132 |
| 2,944,927 | 7/1960 | Dosmann | 161—189 X |
| 3,003,903 | 10/1961 | Vaughan | 156—229 X |
| 3,133,854 | 5/1964 | Simms | 161—189 |
| 3,228,823 | 1/1966 | Usala et al. | 161—186 |
| 3,370,111 | 2/1968 | Boone | 161—1 X |

HAROLD ANSHER, Primary Examiner

U.S. Cl. X.R.

156—244, 311; 161—6, 189, 402, 410